Dec. 22, 1942.　　　　M. WATTER　　　　2,306,008
WHEEL
Filed July 26, 1940
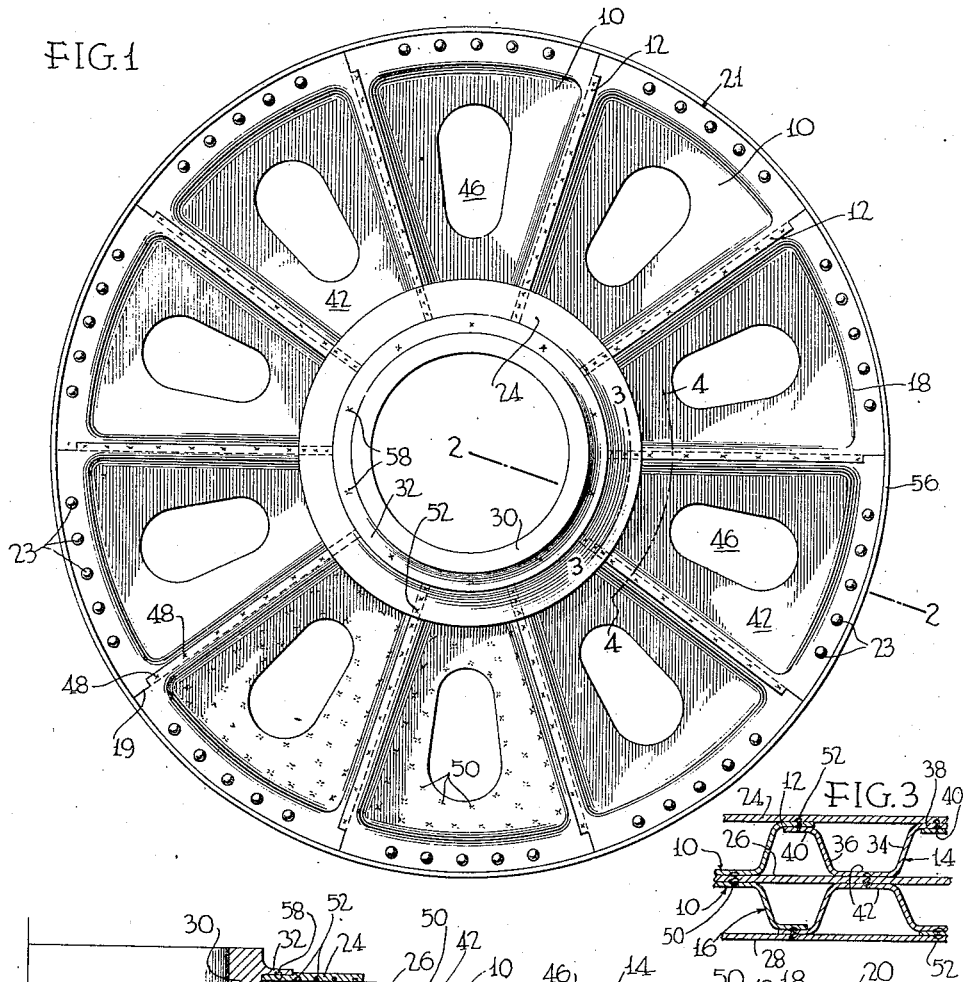
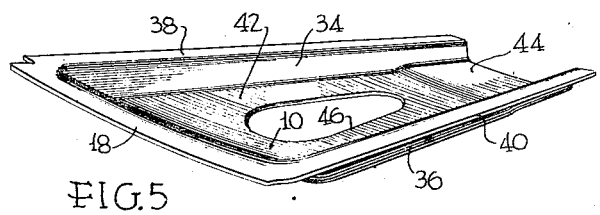
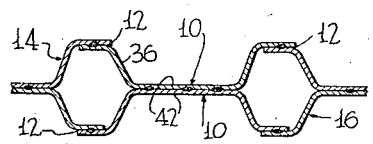
INVENTOR
Michael Watter
BY John P. Tarbox
ATTORNEY Patented Dec. 22, 1942

2,306,008

UNITED STATES PATENT OFFICE 2,306,008

WHEEL

Michael Watter, Philadelphia, Pa., assignor to Edward G. Budd Manufacturing Company, Philadelphia, Pa., a corporation of Pennsylvania Application July 26, 1940, Serial No. 347,733

9 Claims. (Cl. 74—230.8)

This invention relates to wheels and more particularly to wheel structures of a large radius which may be formed from a plurality of light sheet metal stampings.

In wheels especially of great size it is relatively difficult to stamp an entire disc to form the wheel body from a single piece of sheet metal with such necessary reinforcing ribs and corrugations and the like as may be necessary without considerable difficulty and great expense, and the present invention is directed to a wheel construction designed to avoid such disadvantages and composed of a plurality of relatively small sector-shaped stampings suitably flanged for strength, each one identical to the other and which stampings are adapted to be readily assembled by any such fastening means, the preferred form being through spot welding.

It is, accordingly, an object of the invention to provide a wheel structure composed of a plurality of similar stampings, all of which may be formed by a single set of dies and which may be readily assembled to form a substantially integral wheel structure with a minimum of assembly operations.

Another object of the invention is to provide a wheel structure composed of a plurality of segmental identical stampings in which the stampings are so flanged and shaped as to be readily adapted to spot welding and to add strength whereby relatively light gauge material may be employed, such as would be the case if the material were of high tensile strength such as cold-rolled stainless steel.

The above and other novel features of the invention will appear more fully hereinafter from the following detailed description when taken in conjunction with the accompanying drawing; it is expressly understood, however, that the drawing is employed for purposes of illustration only and is not designed as a definition upon the limits of the invention, reference being had for this purpose to the appended claims.

In the drawing wherein similar reference characters refer to similar parts throughout the several views, Figure 1 is a side elevation of a complete wheel.

Figure 2 is a radial section taken through the wheel substantially on the line 2—2 of Figure 1.

Figure 3 is an arcuate section taken through the hub portion of the wheel substantially on the line 3—3 of Figure 1.

Figure 4 is another arcuate section taken through the wheel at a point midway in between the hub and the rim substantially on the line 4—4, and Figure 5 is a perspective view of one of the twenty identical stampings employed in the assembly of the wheel.

Referring to Figure 1 the wheel is illustrated as being composed of a plurality of stampings 10 joined together by spot welds along adjoining edges 12. In Figure 2 wherein a radial section is illustrated, it will be seen that the wheel body is composed of two identical side faces or body portions 14 and 16, each of which is composed of a plurality of the sector-shaped plates 10. As illustrated in Figure 2, it will be seen that the plates at their outer end are curved or flanged as at 18 to provide an annular sheave groove in which a rim 20 and liner 22 may be positioned. The inner ends of the sector plates are bound together through annular hub discs 24, 26 and 28 and the entire assembly is tightly arranged upon a cylindrical hub member 30 having an end flange 32.

The detailed structure of the wheel may best be understood from a consideration of the mode of assembly. As is illustrated in Figure 5, the sector-shaped stamping, a plurality of which form the main body of the wheel, is formed with stiffening flanges 34 and 36 along its radial edges, which flanges in turn are provided with attaching flanges 38 and 40 lying in planes substantially parallel to the central portion 42 of the stamping. In practice, the flanges 38 and 40 lie in planes spaced from one another by the thickness of the material employed so that when the flange 38, for example, is lapped over the flange 40 of an adjacent sector plate, the central portions 42 of the adjacent sector plates may all lie in a common plane. Each stamping in addition to being provided with the radial flanges illustrated is flanged about its outer circumference as at 18 in order to provide a half portion of the annular groove in which the rim 20 and liner 22 are to be positioned. The flange 18 is so arranged as to squarely abut similar adjoining flanges as at 19 (see Figure 1) and the planes of the flanges 38 and 40 are offset by a relatively small amount from the flange 18 in order to make this possible. The stamping additionally is provided with a slight offset as at 44, the offset being substantially one-half the thickness of the metal of the annular hub disc 26. As illustrated in Figure 5 the sector-shaped plate is provided with an aperture 46 in order to lighten the structure or for any other suitable purpose. In practice, it will be understood, however, that with larger diameter wheels the number of sectors of which the wheel is composed will be increased and they will become relatively long in radial extent and narrow in average width. In such structures, such an aperture might be disadvantageous in that it would weaken the structure.

Assembly of the wheel is accomplished by laying a plurality of the sector-shaped stampings 10 together in sufficient number to form a continuous side disc member with the flanges 38 overlying the adjacent flanges 40 of the adjacent sectors. Thereupon the overlapping flanges 38 and 40 are spot welded at a plurality of points as is indicated at 48. Two such discs are constructed and thereafter laid back to back with the annular hub disc 26 positioned in the space provided by the offsets 44. A plurality of spot welds 50 are then effected between the portion of the plates which are in back to back engagement and through the plates and the annular disc 26. Subsequently, annular discs 24 and 28 are secured to the flanges 38 and 40 at their inner ends through spot welds 52, access being had for this purpose from the inside of the hub, it being understood that the cylindrical hub member 30 is not at this stage of the assembly in position. The rim member 20 and liner 22 if made in continuous elements would obviously be assembled at the time the disc members are arranged back to back and secured through the welds 50. However, in practice the rim and liner members are preferably formed from strip material shaped to the cross section shown in Figure 2 and thereafter formed into a discontinuous annular liner, the ends 21 of which abut at some point along the periphery of the wheel. The rim 20 may be spot welded to the flanges 18 as at 54 and may be provided with beads 56 to provide a finished appearance. For wear purposes, a liner 22 of any desired configuration may be superimposed upon the rim and the same riveted or otherwise secured in place, the use of rivets 23 being illustrated since through the use thereof, the liner, which for lightness may be of an aluminum alloy, may be easily replaced from time to time.

Upon completion of the assembly to the point described the hub portion of the wheel may be bored to receive the hub 30. In order to assure a snug engagement between the hub 30 and the hub portion of the wheel, in practice it is preferable to shrink the hub in dry ice prior to assembly so that it will expand, when assembled, into tight engagement with the internal bore of the wheel. Upon assembly of the hub 30, the flange 32 may be spot welded to the disc 24 at spaced points as is indicated at 58. An annular ring 60 may be bolted in position on the other end of the hub in snug engagement with the annular hub disc 28, thus providing the equivalent of an end flange on the hub member 30.

It will be observed that the complete wheel structure resembles in effect a combined spoked disc wheel. However, the presence of the spoke-like effect is merely incidental and a necessary result of the design of the stamping employed. It will be understood that in employing thin sheet material in structural members, stiffening beads and reinforcements are necessary in order to maintain a high resistance to crippling. Referring to Figures 3 and 4 particularly, it will be seen how the flanges 34 and 36 form in conjunction with the central portion 42 of each stamping a channel section, which of itself has considerable resistance to buckling. With thinner materials, the spacing between the flanges 34 and 36 would have to be decreased in order to maintain the maximum strength, and as in large diameter wheels, a larger number of sectors would have to be employed in order to insure a channel section formed by the flanges 34 and 36 of proper strength.

There has thus been illustrated a wheel readily fabricated from stampings of a size which may be easily and cheaply made in large numbers and the assembled structure is one in which the strength is as great, if not greater than, that which would be present in a wheel composed of a single integral stamping. In practice, if lightness is desired, sheet stainless steel may be employed and the hub may be formed from a stainless steel casting or any other suitable material.

Though a single embodiment of the invention has been illustrated, it is to be understood that the invention is not limited to the exact details shown in the drawing since various changes in the construction and arrangement of parts may be made without departing from the spirit of the invention, as will be apparent to those skilled in the art, reference will be had to the appended claims for a definition of the limits of the invention.

What is claimed is:

1. A sector-shaped stamping for a wheel having arcuate, concentric inner and outer edges and substantially straight radial edges, said stamping having a central flat portion and being axially flanged along each radial edge and each flange being provided additionally with an attaching flange extending substantially in a plane parallel with the central portion said outer edge being axially flanged and terminating in a radial flange substantially in the same plane as and continuous with said attaching flanges.

2. A sector-shaped stamping for a wheel having curved inner and outer edges and substantially straight radial edges, said stamping having a central flat portion and being flanged along each radial edge, each flange being provided additionally with an attaching flange lying in substantially parallel planes and said central flat portion being offset slightly adjacent said curved inner edge.

3. A sector-shaped stamping for a wheel having curved inner and outer edges and substantially straight radial edges, said stamping having a central flat portion and being flanged along each radial edge, each flange being provided additionally with an attaching flange lying in substantially parallel planes and said plate being flanged along its outer curved edge in the same direction as the radial edge flanges and said central flat portion being offset slightly adjacent said curved inner edge.

4. A wheel comprising a pair of body disc portions arranged back to back, each disc portion comprising a plurality of substantially identical sector-shaped stampings flanged along their radial edges, said stampings being offset adjacent their inner peripheries with adjacent stampings being secured to one another through the adjoining flanges thereof and an annular hub disc arranged between and confined within the offsets of said body disc portions, said body disc portions and said hub disc being secured together by a plurality of spot welds.

5. A wheel comprising a pair of body disc portions arranged back to back, each body disc portion comprising a plurality of substantially identical sector-shaped stampings flanged along their radial edges with adjacent stampings secured to one another, said stampings being flanged along their outer periphery to receive a rim member, a rim member secured to said peripheral flanges, and a plurality of annular hub discs secured to said body disc portions, one of said hub discs being located between said body disc portions and another being secured to the flanges of the stampings composing one of the body disc portions.

6. A wheel comprising a pair of body disc portions arranged back to back, each body disc portion comprising a plurality of substantially identical sector-shaped stampings flanged along their radial edges with adjacent stampings secured to one another, said stampings being flanged along their outer periphery to receive a rim member, a rim member secured to said peripheral flanges, a plurality of annular hub discs secured to said body disc portions, one of said hub discs being located between said body disc portions and another being secured to the flanges of the stampings composing one of the body disc portions, and a hub positioned within said annular discs and said wheel body portions.

7. A wheel comprised of two sets of a plurality of sector-shaped members having curved concentric inner and outer edges and substantially straight radial flanged edges having attaching flanges secured to adjacent sector attaching flanges, each set constituting an annular wheel body portion disc, said sets being secured together in back to back relation.

8. A wheel comprised of two sets of a plurality of sector-shaped members having curved concentric inner and outer edges and substantially straight radial flanged edges having attaching flanges secured to adjacent sector attaching flanges, each set constituting an annular wheel body portion disc, said sets being secured together in back to back relation, and an annular hub disc having a central aperture of a curvature similar to the curvature of said curved inner edges, arranged between said wheel body portions and secured integrally thereto.

9. A wheel comprising a pair of body disc portions, each having a plurality of sector-shaped stampings, each of said stampings having a sector flat portion, integral flanges extending laterally from the radial edges thereof and radial flanges extending from said first flanges substantially parallel to said flat portion, the radial flanges of each segment of each disc portion being disposed in overlapped relation with and secured to the corresponding flanges of the adjacent segments, said disc portions being secured together with the flat portions thereof in face-to-face engagement and with the spaces confined by the laterally extending and radial flanges thereof in alignment to provide hollow radial spoke-like portions.

MICHAEL WATTER.